United States Patent
Urban

[15] 3,666,139
[45] May 30, 1972

[54] TANK
[72] Inventor: Norbert Urban, Rotgersbuttel, Germany
[73] Assignee: Volkswagen Aktiengesellschaft, Wolfsburg, Germany
[22] Filed: Nov. 30, 1970
[21] Appl. No.: 93,758

[30] Foreign Application Priority Data
Dec. 2, 1969 Germany..........................19 60 651.1

[52] U.S. Cl. .........................................220/85 S, 220/85 VS
[51] Int. Cl.............................................................B65d 25/00
[58] Field of Search ...............220/44 R, 85 S, 85 UR, 85 VS, 220/DIG. 27; 62/50

[56] References Cited
UNITED STATES PATENTS

| 1,709,257 | 4/1929 | Fleming | 220/85 S |
| 2,373,118 | 4/1945 | Johnson | 220/44 R |
| 3,586,015 | 6/1971 | Kitzner | 220/85 VS |
| 3,071,285 | 1/1963 | Friend | 220/44 R |
| 2,157,635 | 5/1939 | Shaw | 220/44 R |
| 3,014,615 | 12/1961 | Stewart | 220/85 S |

Primary Examiner—Lloyd L. King
Attorney—Ernest F. Marmorek

[57] ABSTRACT

A container, especially a fuel tank for a motor vehicle, having a top wall and opposite side walls, comprising a plurality of conduits for connecting the interior of the container with the atmosphere, each of the conduits having a first, substantially horizontally extending section, when the container is in its normal substantially horizontal position and extending from an opening in the interior at one side wall toward the opposite side wall, the first section merging into a substantially vertically extending second section of the respective conduit at a sharply bent portion thereof, the conduits being of such dimension that, upon inclination of the container from the normal position, gases forming in the interior rise to the respective bent portion of those conduits, the first sections of which point downwardly, and that the liquid level in those conduits the first sections of which point upwardly is prevented from being lifted out of the second sections of the conduits.

8 Claims, 3 Drawing Figures

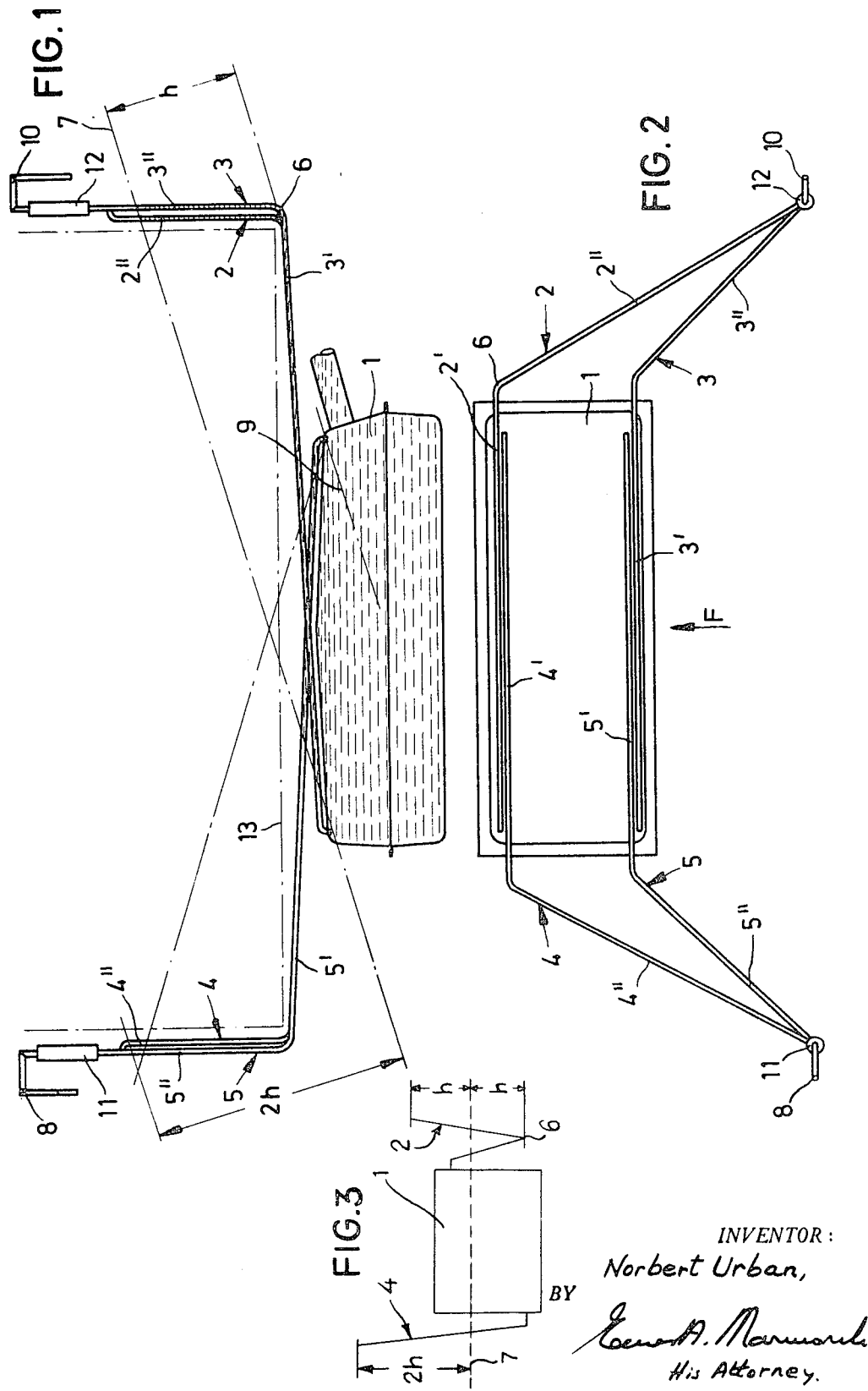

TANK

BACKGROUND OF THE INVENTION

The present invention relates to a container, and more specifically to a fuel or gas tank for motor vehicles. Still more specifically, the invention relates to a tank provided with conduits connecting the interior of the tank with the atmosphere and in which the conduits each comprise an area extending approximately horizontally along the top wall of the tank. Each such area, starting with an opening establishing the connection with the interior of the tank, extends from the area of one tank side wall in a direction towards the other side wall. Such arrangements are generally known for fuel tanks of motor vehicles, the structure being such that the approximately horizontally extending areas of the conduits extend within the actual tank closely adjacent to and below the top wall thereof.

Aside from use in fuel tanks for motor vehicles or other motor driven means of transportation, the invention relates to and is applicable wherever a tank connected to a vehicle has to have conduits which serve for aerating and de-aerating the tank or for creating an exit for the gases or vapors forming in the interior of the tank, and when upon filling there exists the danger that the liquid in the tank may escape through these conduits.

Theoretically this problem could be solved by providing vertically extending conduit of sufficient height within the range of the top wall of the tank. However, this is usually impossible for reasons of inadequate space. For instance, with motor vehicles the floor of the trunk extending above the tank prevents the use of such vertical extension of the conduits.

It is, therefore, an object of the present invention to provide a tank, and in particular a fuel tank for a motor vehicle, which will overcome the above-mentioned disadvantages.

It is still another object of the present invention to provide a fuel tank of the above described general type, in which the conduits leading from the fuel tank to the atmosphere are designed and dimensioned in such a manner that no liquid from the tank can escape to the atmosphere.

Still another object consists in the provision of a fuel tank for a motor vehicle in which the vertically extending conduit sections or areas do not interfere with the bottom of a trunk space in the vehicle.

BRIEF SUMMARY OF THE INVENTION

The problem underlying the present invention has been solved by having the approximately horizontally extending sections or areas of the conduit change into vertically extending sections at those ends thereof which are remote from their respective opening, and by dimensioning the thus formed sharply bent conduits so that upon inclination of the tank gases or vapors produced therein may advance to the sharply bent section of those conduits the approximately horizontally extending sections of which point downwardly with the respective inclination, without lifting the level of liquid in those conduits the horizontally extending sections of which point upwardly during this inclination up to the free openings of the vertically extending sections of the conduits.

In accordance with the present invention, consequently, escape of the tank content is prevented at least in the practically interesting range of inclination normally encountered, without necessitating more space above the tank. The approximately horizontally extending conduit sections, on the contrary, could at least partially extend within the tank below its top wall. The present invention permits an arrangement in which the conduits surround the bottom of the trunk space, in view of the bent form of the conduits.

The escape of liquid from the tank does not primarily result from the purely static adjustment of the liquid level in the various communicating conduits, but from the fact that for instance in a fuel tank, in the course of time gases and vapors collect above the fuel which are super-imposed upon the just-mentioned static conditions and which press the liquid columns in the conduits to the atmosphere. As shall be described later on, in connection with the drawing, the principle underlying the present invention, when taking into consideration pressure exerted by such gases and vapors, can be verified in such a way that, with the maximum inclination of the tank, the bent areas of those conduits the approximately horizontally extending sections of which point during this inclination downwardly, are spaced from a horizontal plane drawn through the openings associated therewith by a certain distance and that those conduits the approximately horizontally extending sections of which point upwardly are dimensioned in such a way that their free openings are spaced from the same plane by at least double said certain distance.

Since usually inclinations in both directions, towards the front and rear respectively, have to be dealt with, the just described arrangement of the tank should be symmetrical while basing the dimensioning of the conduits on those conditions which require the largest dimension of the conduit.

In accordance with a further development of the present invention, it has proved advantageous to provide the vertically extending sections of the conduits with collecting chambers. If there are several conduits starting from a wall of the tank, it is advantageous to combine the vertically extending sections thereof below their free openings and to provide a common collecting chamber there. In the general case where on each side of the tank "n" conduits have been combined, the volume of the common collecting chamber is the sum of the volumes of the number "n" of approximately horizontally extending section of the "n" conduit. Under these circumstances, the gases and vapors developing in the tank may displace the liquid volume in those conduit sections which approximately extend horizontally and are now inclined downwardly, without the liquid leaving the conduit. The liquid column present in the vertically extending conduit sections do not have to be taken into consideration when dimensioning the collecting chamber since the gases and vapors as soon as they reach the sharp bend of the respective conduit may bubble up without further displacement of the liquid in the vertically extending conduit section.

In a preferred embodiment of the present invention, one conduit each extends upwardly from the area of each of the four corners of the upper tank wall. Such an arrangement takes into consideration all inclinations in all possible directions. Understandably, further conduits may be arranged between the corners of the tank.

For purposes of assuring de-aeration and de-gasing it may be advantageous to let the approximately horizontally extending conduit sections extend slightly upwardly when the vehicle as such is not at an incline, but is in a horizontal plane.

BRIEF DESCRIPTION OF THE DRAWING

The present invention is illustrated by way of example in the attached drawing, in which:

FIG. 1 illustrates a gas tank as seen in the driving direction;

FIG. 2 is the top view of the tank of FIG. 1, with the driving direction indicated by the arrow F; and FIG. 3 diagrammatically illustrates the principle underlying the invention.

DETAILED DESCRIPTION OF A PREFERRED EMBODIMENT

Referring now to the drawing in detail, the gas tank illustrated therein is designated with the reference numeral 1. Four conduits 2, 3, 4 and 5 lead to openings in the upper wall of the tank 1, each conduit comprising at least one substantially horizontally extending section 2', 3', 4' and 5', respectively, when the tank is in its normal, non-inclined position, and one vertically extending section 2'', 3'', 4'' and 5'', respectively. These sections, for instance 2' and 2'', are combined in such a way that they form a sharply bent conduit. For instance with respect to conduit 2, the sharp bend is indicated with the reference numeral 6.

It is assumed for instance that by a corresponding inclination of the vehicle, the left hand front corner of the tank is lifted, fuel is present in conduits 3, 4 and 5. For purposes of illustrating the inclination, the horizontal plane is indicated in FIG. 1 as 7. If no fuel is present in conduit 2, pressure equalization can be effected through conduit 2 if gases or vapors develop in the interior of tank 1. However, during operation incidences occur in which fuel may also be present in conduit 2, such as when the vehicle occupies a new angle of inclination, as for instance in view of driving through a curve. This critical case may for instance occur when immediately upon driving through a curve, the car is parked at an incline. In FIG. 1, such a case is illustrated. In all conduits, there is a liquid column the level of which is determined by their intersection with the horizontal plane 7. This means that the otherwise substantially horizontally extending section 2' now extends downwardly at an incline and that consequently gases or vapors developing in tank 1 can no longer escape to the atmosphere. On the contrary, this brings about an increase in pressure which in turn results in the conduit 2 as well as in the other conduits in view of their common connection, in an increase in the liquid level.

In order to prevent the escape of liquid from any one of the conduits, the arrangement according to the present invention is such that, for instance in the example illustrated in the drawing, the gas or vapor reaches the bent area 6 of conduit 2 before it can press the liquid column in conduits 4 and 5 up to the highest area 8 thereof, i.e. into the range of the free opening. If these steps would not be taken, tank 1 could be emptied up to the level 9 through conduits 4 and 5, in the worst instance. In the embodiment shown this has been prevented by determining the distance $h$ of the bent area 6 perpendicularly to the plane 7 and by designing and dimensioning conduits 4 and 5 on the other side of the tank 1 in such a manner that their free openings, i. e. practically the area 8 has a distance from the now horizontally extending plane 7 which is larger than $2h$. It should by kept in mind that the arrangement just described, i. e. the values $h$ and $2h$ have been selected on the basis of the maximum possible inclination a vehicle can have.

The fact that the conduits 2 and 4 start on opposite sides of the tank is not of any particular importance; it is, however, important that that conduit which is at a lower level when the tank is being tilted, in the present example the conduit 2, has the form of a U or a V whereas the conduit which is at the upper level (conduit 4) is substantially straight (see FIG. 3).

If the pressure rises in tank 1, for instance because of heat or development of gas, the increase in pressure is transmitted in equal amounts to the conduits 2 and 4. However, under the condition illustrated, namely with the conduit 2 entering the tank 1 above the liquid level 7, while the conduit 4 enters the tank below that level, the developing gas can reach the atmosphere only after it has displaced the liquid column between the start of the conduit 2 at tank 1 on one hand and the sharp bend 6 on the other hand. As soon as the gas has reached the bend 6 it can pearl up to the atmosphere along conduit 2. In order to reach bend 6 the gas has to displace a liquid column of the height $h$ from the left branch of conduit 2, since in all communicating conduits and chambers the liquid level 7 is to be used as the reference. This displacement results in the liquid level also rising in the right branch of conduit 2 by the amount $h$, so that relative to bend 6 there exists a pressure difference which is proportional to $2h$. This pressure difference is transmitted to conduit 4 which is, however, as mentioned above, to be considered as a straight conduit. Consequently, whereas in the right branch of conduit 2 the liquid level rises by the amount $h$ with respect to the liquid level 7, the liquid level in the left conduit 4 rises by the amount b $2h$.

As shown in FIG. 1, the vertical areas 2'', 3'' and 4'', 5'' respectively come together in pairs at their ends. A collecting chamber 11, 12 respectively is provided at areas 10 and 8 respectively of their common free ends but above the plane 7, at their largest inclination. Each of the collecting chambers is of such size that it can accommodate the liquid columns displaced from the horizontally extending conduit sections 2', 3', 4' and 5' by the gas or vapor created in tank 1. The collecting chamber 11 consequently has a volume such that it can receive the liquid columns in sections 4' and 5', whereas the collecting chamber 12 is sufficiently large to receive the liquid columns in conduit sections 2' and 3'.

Whereas the dimensioning on the basis of the spacing or distance $h$ is related to the fact that in view of a partial filling of the conduits on the opposite side of the tank 1 upon accumulation of a gas or vapor a rise in pressure occurs in the conduits on the side in question, the collecting chambers 11 and 12 serve for receiving the liquid from the conduits connected therewith. In order to have assurance against fuel flowing from the tank during inclination in any direction, the arrangement according to the present invention is symmetrical with respect to a center line vertically extending in FIG. 1.

The tank surrounds the bottom 13 of the car trunk in the manner of an antler so that it does not interfere with the design of the latter.

If only a simple inclination to one side, for instance an incline or a decline, is to be expected, it would be sufficient to provide for instance only the conduits 2 and 5, or 3 and 4.

From the above, it is apparent that although the invention has been described hereinbefore with respect to a certain specific embodiment thereof, it is evident that many modifications and changes may be made without departing from the spirit of the invention. Accordingly, by the appended claims, we intend to cover all such modifications and changes as fall within the true spirit and scope of this invention.

I claim:

1. A container, especially a fuel tank for a motor vehicle, having a top wall and opposite side walls, which comprises: conduit means for connecting the interior of said container with the atmosphere, each of said conduit means having a first, substantially horizontally extending section, when said container is in its normal substantially horizontal position and extending from an opening in said interior at one side wall toward the opposite side wall, said first section merging into a substantially uprightly extending second section of the respective conduit at a bent portion thereof, said conduit means being of such dimension that, upon inclination of said container from said normal position, gases forming in said interior rise to the respective bent portion of those conduit means the first sections of which point downwardly, and that the liquid level in those conduit means the first sections of which point upwardly is prevented from being lifted out of said second sections of said conduit means.

2. A container according to claim 1 wherein, upon maximum inclination of said container, those conduit means the first sections of which point downwardly have their bent portions spaced from a horizontal plane through their respective opening in the interior of said container by a certain spacing, and wherein those conduit means the first sections of which point upwardly upon such inclination are dimensioned such that their openings in the interior of said container are spaced from said plane by at least twice said certain spacing.

3. A container according to claim 1, which comprises collecting chamber means in said second, vertically extending sections of said conduit means.

4. A container according to claim 3, wherein a plurality of said conduit means rise from said container at one side wall; the second, uprightly extending sections of said last-mentioned conduit means being combined, and common collecting chamber means for said conduit means in said second sections.

5. A container according to claim 4, wherein a number of "n" conduit means are combined adjacent each side wall of said container, and wherein the volume of said common collecting chamber means is the sum of the volumes of the first sections of said "n" conduit means.

6. A container as claimed in claim 1, wherein said substantially horizontal sections are normally positioned at a slight upward slope.

7. A container according to claim 1, in combination with a motor vehicle having a trunk space with a bottom, wherein said conduit means surround said bottom.

8. A container according to claim 1, wherein said conduit means comprises one conduit each extending from each of the four corners of the top wall of said container.

* * * * *